United States Patent [19]
Yoon

[11] Patent Number: 5,978,128
[45] Date of Patent: Nov. 2, 1999

[54] DEFORMABLE MIRROR DEVICE

[75] Inventor: Yong-seop Yoon, Seoul, Rep. of Korea

[73] Assignee: Samsung Electronics Co., Ltd., Kyungki-do, Rep. of Korea

[21] Appl. No.: 09/128,441

[22] Filed: Aug. 4, 1998

[30] Foreign Application Priority Data

Dec. 31, 1997 [KR] Rep. of Korea ............. 97-82105

[51] Int. Cl.$^6$ ................................... G02B 26/08
[52] U.S. Cl. ...................... 359/298; 359/223; 359/318
[58] Field of Search ........................ 359/223, 224, 359/290, 291, 295, 298, 313, 849, 871

[56] References Cited

U.S. PATENT DOCUMENTS

| | | | |
|---|---|---|---|
| 5,739,941 | 4/1998 | Knipe et al. | 359/224 |
| 5,774,604 | 6/1998 | McDonald | 385/18 |
| 5,917,647 | 6/1999 | Yoon | 359/298 |

Primary Examiner—Georgia Epps
Assistant Examiner—Margaret Burke
Attorney, Agent, or Firm—Sughrue, Mion, Zinn, Macpeak & Seas, PLLC

[57] ABSTRACT

A deformable mirror device for changing a proceeding path of an incident light includes a substrate, a pair of posts protruding from the upper surface of the substrate and spaced a predetermined distance from each other, an electrode formed on the upper surface of the substrate, a reflection mirror arranged to face the electrode by being supported by the posts, and first and second support pieces having predetermined rigidities for supporting the reflection mirror. The support pieces are connected between the reflection mirror and the posts so that an inclination of the reflection mirror can be adjusted by an electrostatic attraction between the electrode and the reflection mirror. The electrode is arranged to be offset from the reflection mirror such that a magnitude of the forces applied to the electrode at the positions between each of the first and second support pieces and the reflection mirror differ from each other. Therefore, in the deformable mirror device, the path of light can be easily changed with a low driving voltage.

3 Claims, 4 Drawing Sheets

DEFORMABLE MIRROR DEVICE

BACKGROUND OF THE INVENTION

1. Field of the Invention

The present invention relates to a deformable mirror device (DMD) for changing a proceeding path of an incident light, and more particularly, to a deformable mirror device having an improved structure so that the path of light can be easily changed with a low driving voltage.

2. Description of the Related Art

In general, DMDs having a plurality of reflection mirrors installed to be capable of pivoting by an electrostatic force are for changing a path of light by a predetermined degree. The DMD is used in image display devices of a projection TV, and optical scanning devices such as a scanner, copying machines, and facsimile machines. In particular, when being adopted as an image display device, as many reflection mirrors as the number of pixels are arrayed on a two dimensional plane and each reflection mirror is pivoted according to video signals to each pixel to adjust color and brightness.

Referring to FIG. 1, a conventional DMD is comprised of a substrate 1, a pair of posts 3 protruding from a surface of the substrate 1 and spaced apart a predetermined distance, an electrode 5 formed on the substrate 1, and a reflection mirror 7 supported by the posts 3 and arranged to face the electrode 5. The reflection mirror 7 has a pair of support pieces 9 extending therefrom and connected to the posts 3 for supporting the reflection mirror 7.

As shown in the drawing, the support pieces 9 are formed to be asymmetrical such that one support piece 9a is shorter than the other support piece 9b, i.e., L1≠L2 and is elastic enough to support the reflection mirror 7. However, the support piece 9 may have a symmetrical structure.

The electrode 5 has a size corresponding to the reflection mirror 7 and is installed on the substrate 1 to face the reflection mirror 7. Thus, when an electrical potential is applied to the electrode 5, an electrostatic attraction force is generated by the electrical potential difference between the electrode 5 and the reflection mirror 7 and thus the reflection mirror 7 approaches toward the electrode 5 overcoming the rigidity of the support piece 9, thereby changing its inclination. When the electrical potential difference between the electrode 5 and the reflection mirror 7 disappears, the reflection mirror 7 returns to its original state due to the rigidity of the support piece 9 and maintains a horizontal state.

In the DMD having the above asymmetrical structure, as shown in FIG. 2, when an electrical potential difference is generated between the electrode 5 and the reflection mirror 7, the boundary portions between the support pieces 9a and 9b and the reflection mirror 7 respectively receive forces $F_1$ and $F_2$ directing the electrode 5. Accordingly, the reflection mirror 7 sags downward a predetermined distance ($d_1$ and $d_2$). Here, the forces $F_1$ and $F_2$ differ from each other by the difference in the rigidities $k_1$, and $k_2$ of the two support pieces 9a and 9b, and the distances $d_1$ and $d_2$ indicating the displacement of the reflection mirror 7 downward also differ from each other, so that the inclination of the reflection mirror 7 is determined.

The forces $F_1$ and $F_2$ are inversely proportional to the distances $L_1$ and $L_2$ between the resultant force $F_{es}$ of a point from which the electrostatic attraction force acts and the support point of the post 3.

In the drawing, since $L_1<L_2$ and $k_1>k_2$, and $F_1>F_2$, the larger force $F_1$ is applied to the portion with a larger rigidity $k_1$, and the smaller force $F_2$ is applied to the portion with a smaller rigidity $k_2$. Thus, the inclination becomes less. Meanwhile, increases of voltage applied to the electrode 5 and stress acting on the support piece 9 may cause the product to be less reliable.

Further, as shown in FIG. 3, when the two support pieces 9 are arranged to be symmetric ($L_1=L_2$), since the forces $F_1$ and $F_2$ and the rigidity $k_1$, and $k_2$ of the support piece 9 are equal, the reflection mirror 7 sags toward the electrode 5 while maintaining a horizontal state. Thus, no change in the light path occurs.

SUMMARY OF THE INVENTION

To solve the above problems, it is an objective of the present invention to provide a deformable mirror device which enables a large change in the degree of light path at a relatively low electrostatic voltage by adjusting the position of an electrode with respect to a reflection mirror.

Accordingly, to achieve the above objective, there is provided a deformable mirror device including a substrate, a pair of posts protruding from the upper surface of the substrate to be spaced a predetermined distance from each other, an electrode formed on the upper surface of the substrate, a reflection mirror arranged to face the electrode by being supported by the posts, and first and second support pieces having predetermined rigidities for supporting the reflection mirror, the support pieces being connected between the reflection mirror and the posts, so that inclination of the reflection mirror can be adjusted by an electrostatic attraction between the electrode and the reflection mirror, in which the electrode is arranged to be offset from the reflection mirror such that magnitude of the forces applied to the electrode at the positions between each of the first and second support pieces and the reflection mirror differ from each other.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
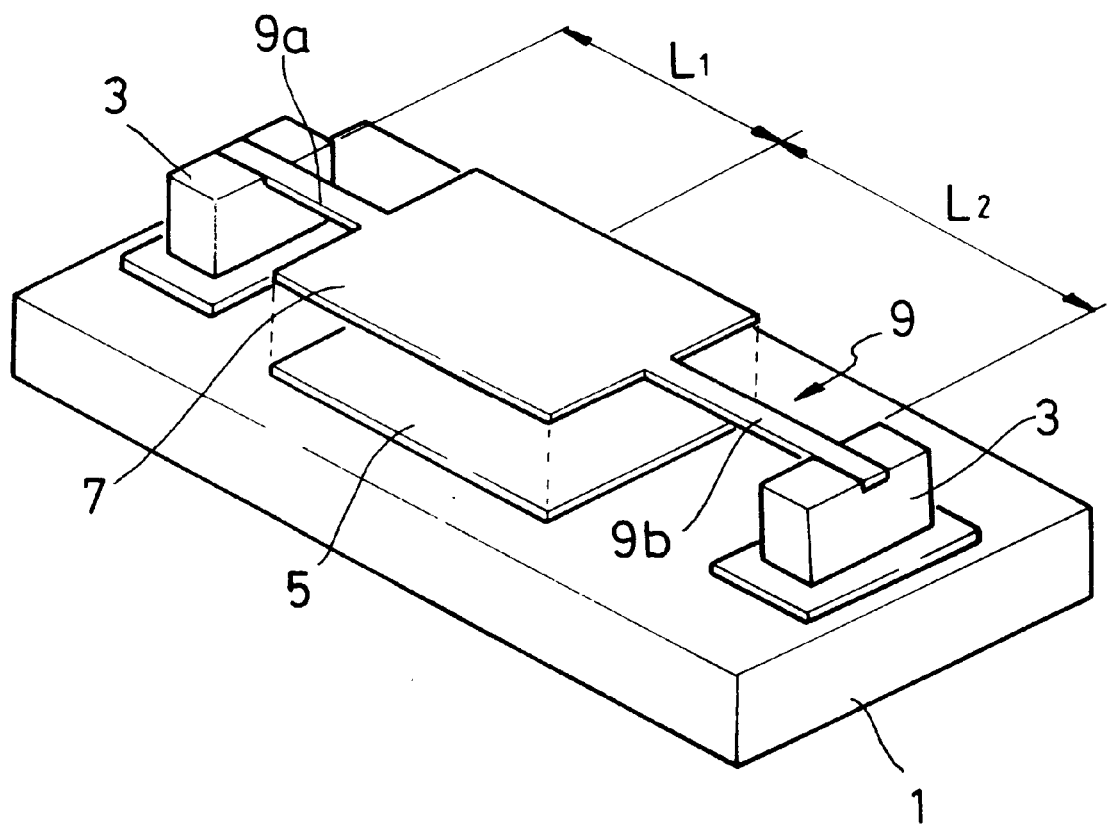
FIG. 1 is a perspective view illustrating the conventional DMD.
Figure 2:
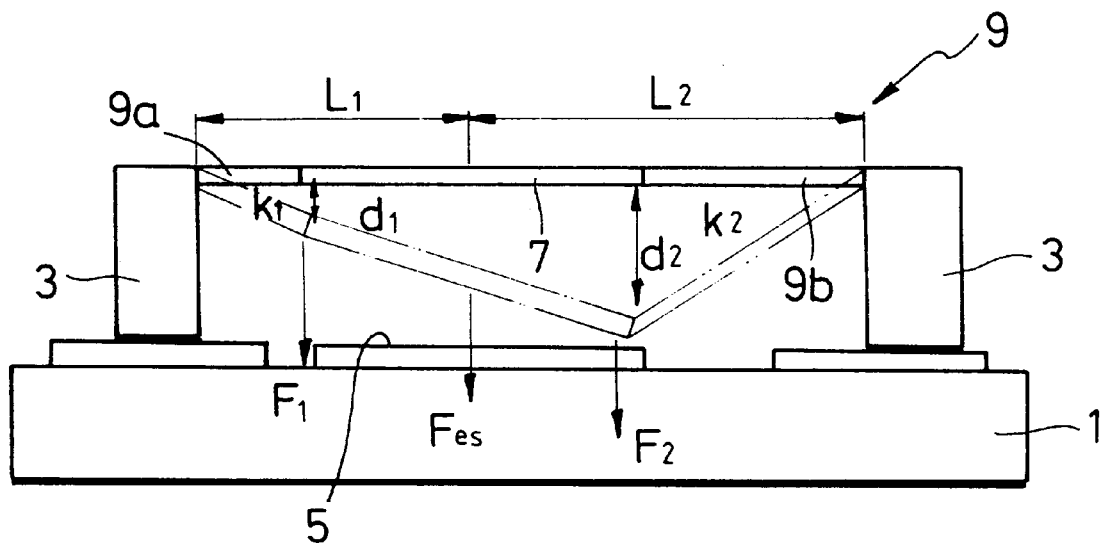
FIG. 2 is a front view of the conventional DMD having an asymmetrical structure.
Figure 3:
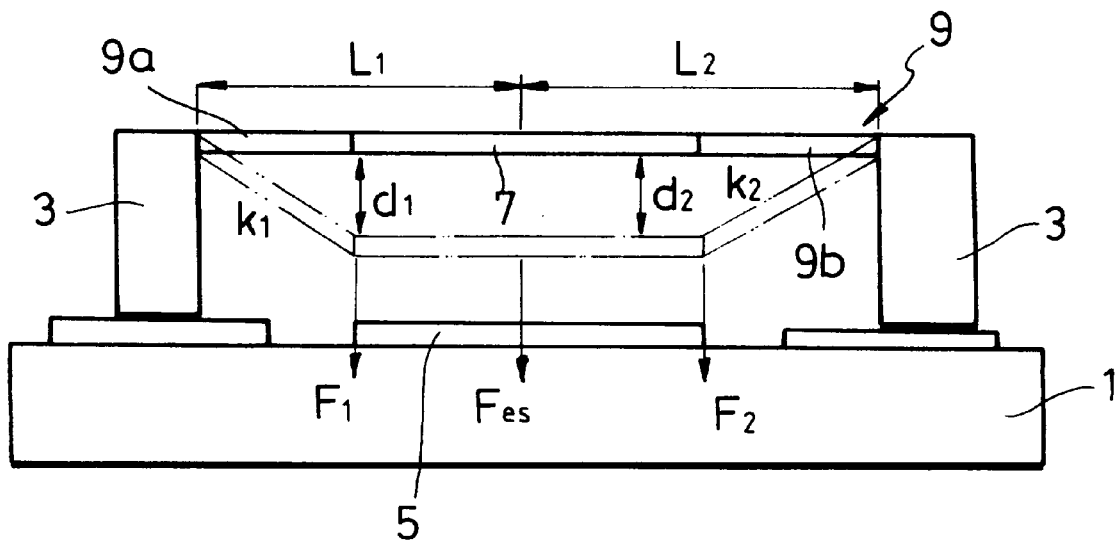
FIG. 3 is a front view of the conventional DMD having a symmetrical structure.
Figure 4:
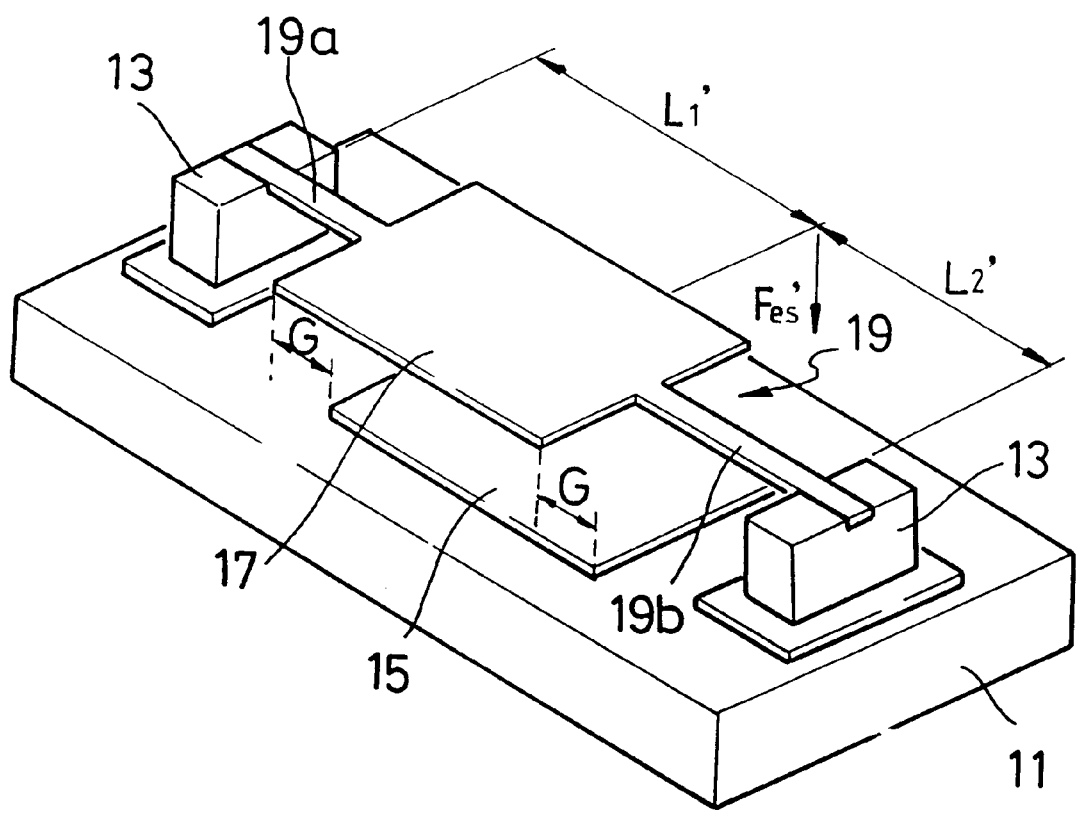
FIG. 4 is a perspective view illustrating a DMD according to the present invention.

Referring to FIG. 4, the deformable mirror device according to a preferred embodiment of the present invention is comprised of a substrate 11, a pair of posts 13 protruding from the upper surface of the substrate 11 and spaced a predetermined distance from each other, an electrode 15 formed on the substrate 11, a reflection mirror 17 arranged to face the electrode 15 by being supported by the posts 13, and support pieces 19 having a predetermined rigidity for supporting the reflection mirror 17.

The support pieces 19 includes a first support piece 19a and a second support piece 19b which are respectively connected at opposing sides of the reflection mirror 17 to the posts 13 to support the reflection mirror 17.

Figure 5:
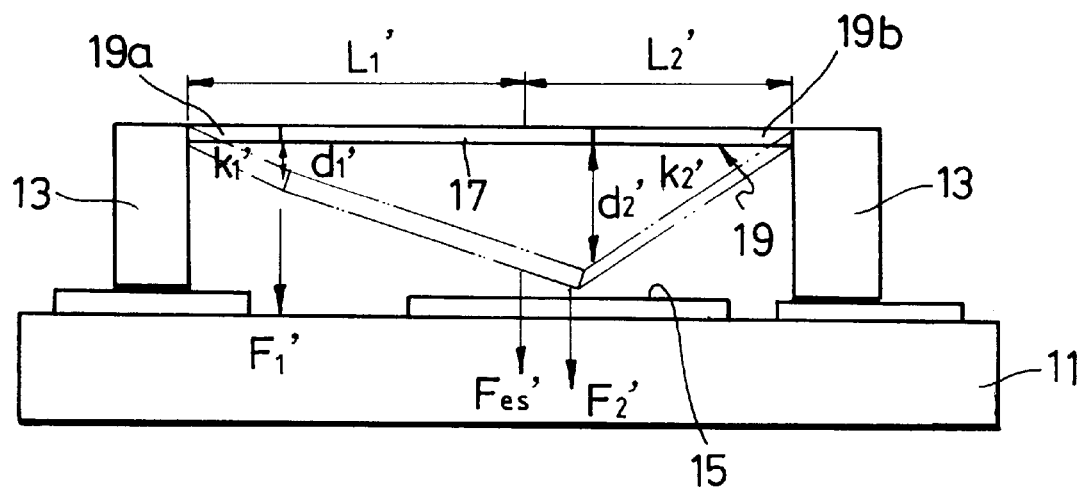
FIG. 5 is a front view of a DMD having an asymmetrical structure according to the present invention.
Figure 6:
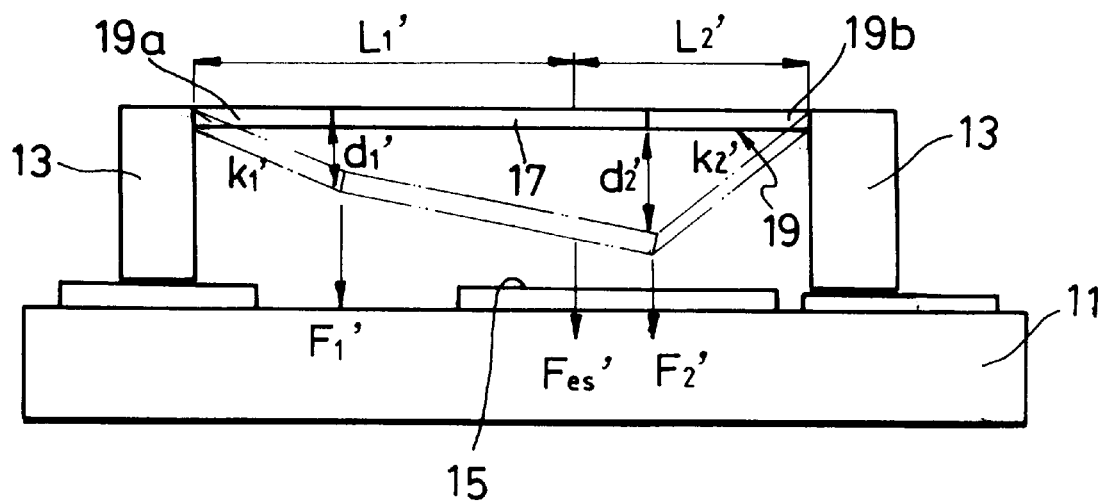
FIG. 6 is a front view of a DMD having a symmetrical structure according to the present invention.

Here, as shown in FIGS. 4 and 5, the first and second support pieces 19a and 19b differ in their lengths ($L_1'>L_2'$), thus forming an asymmetrical structure, so that the rigidity $k_1'$ of the first support piece 19a is greater than the rigidity $k_2'$ of the second support piece 19b. Alternatively, as shown in FIG. 6, the first and second support pieces 19a and 19b can be formed in a symmetrical structure such that the rigidity of the respective first and second support pieces 19a and 19b are equal.

The size of the electrode 15 corresponds to the size of the reflection mirror 17 and the electrode 15 is offset a predetermined distance G from the reflection mirror 17. Thus, the strength of a force acting on the electrode 15 differs according to the positions between the first support piece 19a and the reflection mirror 17, and the second support piece 19b and the reflection mirror 17. Here, when a potential voltage is applied to the electrode 15, electrostatic attraction is generated due to the voltage difference between the electrode 15 and the reflection mirror 17. Thus, the reflection mirror 17 deforms to approach the electrode 15, overcoming the rigidity of the support pieces 19, thereby changing its inclination. If the potential voltage difference between the electrode 15 and the reflection mirror 17 is removed, the rigidity of the support piece 9 allows the reflection mirror 17 to return to its original position to thus maintain a balanced state.

The operation according to a preferred embodiment of the present invention will be described with reference to FIGS. 5 and 6.

As shown in FIG. 5, the second support piece 19b is longer than the first support piece 19a such that the rigidity $k_1'$ of the first support piece 19a can be greater than the rigidity $k_2'$ of the second support piece 19b. The electrode 15 is arranged to be offset from the reflection mirror 17 toward the second support piece 19b.

When a potential voltage difference is generated between the electrode 15 and the reflection mirror 17, connecting portions between the first and second support pieces 19a and 19b and the reflection mirror 17 receive forces $F_1'$ and $F_2'$, respectively, toward the electrode 15. Accordingly, both sides of the reflection mirror 17 are bent downward by predetermined distances $d_1'$ and $d_2'$, respectively. Here, the forces $F_1'$ and $F_2'$ are different from each other due to the difference in the rigidities $k_1'$ and $k_2'$ of the two support pieces 19a and 19b. Thus, the distances $d_1'$ and $d_2'$ of the downward movement by the reflection mirror 17 differ so that the inclination of the reflection mirror 17 is determined. In this case, the resultant force $F_{es}'$ of the electrostatic forces is moved in the offset direction of the electrode 15 so that $L_1'>L_2'$ and $F_1'<F_2'$. Thus, a greater force $F_2'$ is applied to the less rigid portion $k_2'$, whereas the more rigid portion $k_1'$ receives a smaller force $F_1'$, thereby making the degree of inclination greater.

Also, unlike the conventional structure, since the smaller force $F_1'$ is applied to the more rigid portion $k_1'$, the degree of inclination of the reflection mirror 15, as that in the conventional structure, can be obtained with only the less rigid portion $k_1'$ compared to the conventional rigidity k1. Therefore, the inclination of the reflection mirror 17 can be adjusted by a low electrostatic voltage.

FIG. 6 shows a DMD having symmetrical support pieces. As shown in the drawing, the electrode 15 is arranged to be offset toward the second support piece 19b, to the right of the drawing sheet, and the resultant force $F_{es}'$ of the electrostatic forces is also moved so that $L_1'>L_2'$ and $F_1'<F_2'$. Thus, although the rigidities applied to the first and second support pieces 19a and 19b are equal, $F_1'<F_2'$ and $d_1'<d_2'$ so that the reflection mirror 17 is inclined. Thus, in the symmetrical structure of the support pieces, the degree of the reflection mirror 17 can be adjusted by changing the position of the electrode 15. Also, compared to the DMD having a asymmetrical structure shown in FIG. 5, since the same degree of inclination of the reflection mirror 17 can be obtained with only a less rigid portion $k_2'$ of the second support piece 19b, driving by a lower electrostatic voltage is possible.

In FIGS. 4 through 6, although the electrode 15 and the reflection mirror 17 are the same size and moved a predetermined distance G to any one side, these are only for purpose of explanation. Thus, it is possible to make the shape and size of the electrode 15 different from those of the reflection mirror 17 such that the position of the resultant force $F_{es}'$ are offset from the center of the reflection mirror.

As described above, in the DMD according to the present invention, since the electrode is arranged to be offset from the reflection mirror toward one side, electrostatic voltage needed for driving the reflection mirror can be lowered, thus improving the reliability and efficiency.

Also, when the first and second support pieces for supporting the reflection mirror are of a symmetrical structure, the inclination of the reflection mirror can be adjusted.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A deformable mirror device comprising:
    a substrate;
    a pair of posts protruding from an upper surface of said substrate and spaced a predetermined distance from each other;
    an electrode formed on said upper surface of said substrate;
    a reflection mirror arranged to face said electrode by being supported by said posts; and
    first and second support pieces having predetermined rigidities for supporting said reflection mirror, said support pieces being connected between said reflection mirror and said posts, so that an inclination of said reflection mirror can be adjusted by an electrostatic attraction between said electrode and said reflection mirror;
    wherein said electrode is arranged to be offset from said reflection mirror such that a magnitude of forces applied to said electrode at positions between each of said first and second support pieces and said reflection mirror differ from each other.

2. The deformable mirror device as claimed in claim 1, wherein said second support piece is longer than said first support piece and said electrode is arranged to be offset toward said second support piece with respect to said reflection mirror, such that a rigidity of said first support piece is greater than a rigidity of said second support piece.

3. The deformable mirror device as claimed in claim 1, wherein said first and second support pieces have a same length such that rigidities of said first and second support pieces are equal, and said electrode is arranged to be offset toward one of said first and second support pieces with respect to said reflection mirror, such that the magnitude of forces applied to said electrode at the positions between each of said first and second support pieces and said reflection mirror differ from each other.

* * * * *